(12) United States Patent  (10) Patent No.: US 8,253,373 B2
Manor et al.  (45) Date of Patent: Aug. 28, 2012

(54) BATTERY POWERED CHARGER

(75) Inventors: Dror Manor, Hertzlia (IL); Amnon Saar, Tel Aviv (IL); Guy Weinstein, Neve Monosson (IL); Daniel Breiting, Zerufa (IL); Hans Vercoulen, Helden (NL)

(73) Assignee: Techtium Ltd, Tel Aviv (IL)

( * ) Notice: Subject to any disclaimer, the term of this patent is extended or adjusted under 35 U.S.C. 154(b) by 207 days.

(21) Appl. No.: 12/520,093

(22) PCT Filed: Dec. 20, 2007

(86) PCT No.: PCT/IL2007/001582
§ 371 (c)(1),
(2), (4) Date: Jun. 4, 2010

(87) PCT Pub. No.: WO2008/075358
PCT Pub. Date: Jun. 26, 2008

(65) Prior Publication Data
US 2011/0148344 A1    Jun. 23, 2011

Related U.S. Application Data

(60) Provisional application No. 60/875,814, filed on Dec. 20, 2006, provisional application No. 60/996,220, filed on Nov. 7, 2007.

(51) Int. Cl.
*H02J 7/00* (2006.01)
(52) U.S. Cl. ........ 320/107; 320/103; 320/113; 320/114; 320/115; 320/128
(58) Field of Classification Search .................. 320/103, 320/107, 113, 115
See application file for complete search history.

(56) References Cited

U.S. PATENT DOCUMENTS

| 5,396,164 A | 3/1995 | Anegawa |
| 5,723,970 A | 3/1998 | Bell |
| 5,977,747 A | 11/1999 | Huang |

(Continued)

FOREIGN PATENT DOCUMENTS

CN    1081791 A    1/1994

(Continued)

OTHER PUBLICATIONS

Translation of Office Action dated Sep. 15, 2011 issued by the Chinese Patent Office in corresponding Chinese application No. 200780047859.6., 10 pages.
PCT Int'l Search Report for PCT Application No. PCT/IL2010/000056, Jun. 8, 2010, 5 pages.
PCT International Search Report and Written opinion of the ISA, in PCT/IL2007/001582.

*Primary Examiner* — M'Baye Diao
(74) *Attorney, Agent, or Firm* — Maine Cernota & Rardin

(57) ABSTRACT

A charger for recharging the batteries of a portable electronic device even when no external power source is available. A battery or cell is installed within the charger, and when no access is available to a fixed power source into which the charger can be plugged, the internal battery or cell can be used to recharge the electronic device. The internal battery can be a primary battery or a secondary battery. In the latter case, the internal battery can be maintained in a charged state by means of circuitry which, when the charger is plugged into the external power source, charges the internal battery as well as the battery of the electronic device. The external power source can be either an AC power wall socket, in which case the charger includes AC/DC voltage conversion circuits, or a car lighter socket, or the DC output of a conventional wall charger.

12 Claims, 2 Drawing Sheets

U.S. PATENT DOCUMENTS

| | | | |
|---|---|---|---|
| 6,011,327 | A | 1/2000 | Cook et al. |
| 6,043,626 | A | 3/2000 | Snyder et al. |
| 6,118,248 | A * | 9/2000 | Gartstein et al. ............. 320/107 |
| 6,127,801 | A * | 10/2000 | Manor ......................... 320/112 |
| 6,479,963 | B1 | 11/2002 | Manor et al. |
| 6,751,109 | B2 | 6/2004 | Doss et al. |
| 7,166,987 | B2 | 1/2007 | Lee et al. |
| 2002/0047309 | A1 | 4/2002 | Droppo et al. |
| 2003/0197485 | A1 | 10/2003 | Miller et al. |
| 2005/0162131 | A1 * | 7/2005 | Sennami et al. ............. 320/128 |
| 2007/0228834 | A1 | 10/2007 | Hirahara et al. |

FOREIGN PATENT DOCUMENTS

| | | |
|---|---|---|
| CN | 2664257 Y | 12/2004 |
| GB | 224798 | 10/1991 |
| KR | 200275514 A | 5/2002 |
| WO | WO/2006/095352 | 9/2006 |
| WO | WO/2006/095353 | 9/2006 |
| WO | WO/2008/072232 | 6/2008 |
| WO | 2010084494 A1 | 7/2010 |

* cited by examiner

BATTERY POWERED CHARGER

RELATED APPLICATIONS

This application is a National Phase Application filed under 35 USC §371 of PCT Application No. PCT/IL2007/001582 with an International filing date of Dec. 20, 2007, which claims priority of U.S. Provisional Application No. 60/996,220, filed Nov. 7, 2007 and U.S. Provisional Application No. 60/875,814, filed Dec. 20, 2006. Each of these applications is herein incorporated by reference in their entirety for all purposes.

FIELD OF THE INVENTION

The present invention relates to the field of charging devices for portable electronic equipment, especially those for use with mobile telephones.

BACKGROUND OF THE INVENTION

Portable electronic devices generally use internal rechargeable batteries for operation. In order to maintain the internal batteries in a state of charge, the device is generally recharged at regular intervals using a wall mains adaptor unit, whose function is to convert the comparatively high voltage AC mains voltage available at wall sockets, to a low voltage suitable for inputting to the device's charging input. At the same time, such a wall charger often regulates the charging profile to the internal batteries of the electronic device, in order to maximize charging efficiency, and to ensure safe charging. Other types of charger unit utilize the low voltage DC power source available in automobiles, such as the cigarette lighter socket, in order to charge the device's internal batteries. Such external power sources will be known as fixed power sources in this application. Furthermore, the term "wall charger" will generally be used in this application to include any type of charger which is generally plugged into a fixed power source.

However, an AC mains power source, or a car lighter socket, is not always available when the battery of the portable device requires charging, and the user then has to either carry with him spare charged batteries, which could be a safety hazard, or must purchase such batteries, which is not always a simple task, as many portable devices, and especially mobile phones, use dedicated battery packs which are not widely available. Even then, such battery packs are often supplied in a non-charged state.

One solution to this problem is described in U.S. Pat. No. 6,479,963, for "Rechargeable Battery Packs", to the inventors of the present application, in which a novel battery pack is disclosed which can be fitted with a widely available primary cell to recharge the rechargeable cells of the portable device. Another solution is described in co-pending PCT Application published as International Patent Application No. WO/2006/095353 for "Portable Battery Operated Power Supply", also to inventors of the present application, in which a special external battery pack, preferably containing a rechargeable cell, is used to enable recharging of the device at any location.

Each of these solutions has its own disadvantage. The former requires that the device be equipped with the special battery pack such as that described in the patent, while the latter requires of the device owner to carry with him/her the special external battery pack, and to ensure that the external battery pack is kept charged by connecting it to a conventional wall charger at the required intervals.

There therefore exists a need for a portable charging system which overcomes at least some of the disadvantages of prior art systems and methods, to enable the user of portable electronic devices to simply recharge the internal batteries of the device, without the need to have access to a fixed source of charging power.

Though the term battery is strictly speaking understood to mean a pack of at least two cells, in common usage the term is also understood to mean a single cell. Consequently, these two terms, battery and cell, may have been used interchangeably in this application, and may also have been thuswise claimed, and the number of cells in the device of the invention is not meant to be limited by use of one or the other term.

The disclosures of each of the publications mentioned in this section and in other sections of the specification, are hereby incorporated by reference, each in its entirety.

SUMMARY OF THE INVENTION

The present invention seeks to provide a new device for providing power to a portable electronic device, either for powering the portable electronic device, or for recharging the batteries of the portable electronic device when no access to an external fixed power source is available. The invention is based on the use of an external charger, such as a wall charger, with an associated auxiliary battery or cell, such that when no access is available to a fixed power source into which the external charger can be plugged, such as a wall power point, or a car lighter socket, the associated auxiliary battery or cell can be used to recharge the battery of the electronic device. The charging device of the present invention preferably incorporates charge control and conversion circuitry for converting the input voltage supplied from the external source to that required to charge the associated auxiliary battery or cell, and to that required for input to the external charger input socket of the electronic device, for powering the electronic device or for charging the electronic device's internal battery. The charge control and converter circuit is preferably a bidirectional converter, in order to control both the charging current from the external source into the associated auxiliary battery, and to control the discharge current from the associated auxiliary battery into the portable electronic device. The circuitry of the battery powered charger of the present invention differs from that of prior art multi-source chargers, such as that described in U.S. Pat. No. 7,166,987 to K. S. Lee et al, for "Portable Charger for Mobile Phone", in that the use of a single bi-directional DC/DC converter as the charge controller for the auxiliary battery enables the provision of a simpler charger structure. The DC output from the external source, whether directly from a car socket, or from an AC/DC wall charger, can be at such a voltage level that it can be supplied directly to the mobile electronic device power input socket, or, by means of a single bidirectional DC/DC voltage converter, to the auxiliary battery. This same DC/DC converter, by virtue of its bidirectionality, is able also to handle, when required, the flow of current and the voltage conversion from the battery out to the mobile device, such that effectively all of the charge control and conversion functions are performed with a single bidirectional control circuit.

The charge control circuit also preferably incorporates battery chemistry detection circuitry, such as that described in co-pending International Patent Application PCT/IL2007/001532 for "Charging Methods for Battery Powered Devices", or in similar battery chemistry detection circuits with simpler algorithms, as is known in the art, such that if the associated auxiliary battery or cell is detected as being primary, recharging thereof is disenabled. This feature is even more important in a battery powered wall charger than in a conventional battery charger, since the additional heat generated in a battery powered wall charger when operating, increases the internal temperature, and the possibility that a primary cell being charged therein may fail catastrophically According to a first preferred embodiment, the auxiliary battery or cell is installed within the external charger itself, preferably within a dedicated battery cavity. An advantage of this embodiment over the prior art devices described hereinabove is that the electronic device user generally carries a normal wall charger, to enable the electronic device to be charged in the conventional manner. Therefore, the use of the charger of this embodiment of the present invention, while providing the user with an in-the-field charging capability, does not involve the need to carry any additional equipment which the user would not otherwise have to carry with him/her.

According to a second preferred embodiment of the present invention, the associated auxiliary battery or cell and its charge control circuitry are not housed within the external charger unit itself, but are contained within a separate housing, which can be connected to a conventional external charger by means of a flying lead. Connection to the portable electronic device is performed in the usual manner, through the charging input socket of the device, either by means of a plug, or by means of another flying lead. This embodiment differs from the first embodiment in that the auxiliary battery is housed in a compartment separate from that of the external charger circuits. In that respect, the external charger output can be considered as being equivalent to the wall source of power, or to the car lighter socket source of power.

The auxiliary battery of the wall charger of the present invention may be either a primary cell, which is readily available from numerous sources for replacement when expended, or a rechargeable cell, in which case, the charger circuits can be arranged such that, once the presence of a secondary cell has been detected, the cell is maintained ready for use in a charged condition, either by being charged if necessary, or by being just trickle charged if already essentially fully charged, every time that the wall charger is connected to the fixed power source.

According to a further preferred embodiment of the present invention, the presence of a battery in the charger provides it with an advantage over conventional chargers, in enabling easier compliance with the current policy of reducing "stand-by power" of electronic devices. If the associated battery is fully charged, the circuitry of the charger of the present invention need only be powered up when there is need to provide power to the portable electronic device. The presence of the on-board battery enables the charging circuits of the charger to be completely disconnected from the external source, such that no stand-by power at all is used from the wall socket or from the car socket. The internal battery can be used to power a very low-power detection circuit for monitoring the portable electronic device for renewed power demand. Once such a demand is detected, the charging circuits can be reconnected to the external source, and can draw power from the external source as needed. This is in contrast to conventional chargers, which generally have to be left connected in a stand-by status to the external source, drawing a trickle charge current whose need may not be immediate, but which consumes typically 250 mW for a small wall charger unit typically of the order of 5 Watts or less. Additionally, the detection circuits can also monitor the state of charge of the on-board charger battery, either by means of its terminal voltage, or by the elapsed time since the last charging operation, and can then reconnect the external source when the state of charge falls below a predetermined level, regardless of whether the electronic device has demanded current or not. This then ensures that the internal battery of the charger remains charged even when the charger is in stand-by mode.

The circuits of the wall charger of the present invention are generally multifunctional and bidirectional, in that they have to be capable of performing at least some of the following functions:

(i) When the charger is plugged into a fixed power source, whether an AC wall power source, or a car socket, or the DC output of a conventional wall charger unit, the circuits should preferably convert the voltage up or down, depending on the voltage supplied, and the voltage required, to a suitable level to provide current for charging or powering the electronic device when it is attached.

(ii) When the charger is plugged into a fixed power source, (as described above) the circuits should be able to convert the voltage to a suitable level to provide current for charging the auxiliary battery or cell of the wall charger.

(iii) The circuits should preferably ascertain whether the auxiliary battery or cell of the wall charger is primary or secondary, so that if primary, the internal battery charging circuit is not enabled.

(iv) When an electronic device is attached to the wall charger, and the charger is not connected to a fixed power source, the circuits should enable the device to draw charging current from the auxiliary battery, whether primary or secondary.

(v) Since the wall charger auxiliary battery, if a secondary battery, needs to be both charged and discharged, the circuitry which controls these functions preferably has bidirectional characteristics, such as is described in PCT Application No. PCT/IL2006/000317, published as International Patent Application No. WO/2006/095352 for Bidirectional Battery Charge Controller, incorporated herein by reference in its entirety. If the wall charger is intended for use only with a primary battery, then bidirectionality is not required.

There is thus provided in accordance with a preferred embodiment of the present invention, a charger for a battery operated electronic device, the charger comprising:

(i) an input for connection to an external power source supplying current at a first voltage, (ii) an output for connection to the battery operated electronic device, (iii) circuitry for supplying the electronic device with current when the charger is connected to the external source, (iv) a cavity for mounting in the charger at least one battery having a terminal voltage different from the first voltage, and different from the voltage required for inputting to the electronic device, the battery supplying the electronic device with current when the charger is not connected to the external power source, (v) a bidirectional converter and charge controller adapted to control current supplied from the at least one battery mounted in the charger to the electronic device, and to control current flowing into the at least one battery when the charger is connected to the external power source, and (vi) circuitry for detecting the chemistry of least one battery.

In the above described charger, the bidirectional converter and charge controller may preferably be further adapted to convert the first voltage to a voltage suitable for charging the at least one battery, and to convert the terminal voltage to a voltage suitable for inputting to the electronic device. Additionally, the external power source can simultaneously cause current to charge the at least one battery, and to supply the electronic device with current. Furthermore, the current supplied by the charger to the electronic device may preferably be utilized to perform at least one of operating the electronic device and charging the battery of the electronic device.

There is further provided in accordance with yet another preferred embodiment of the present invention, a charger as described above, wherein the converter and charge control circuit further comprises circuitry to prevent supply of charging current to the at least one battery when the charger is connected to the external power source.

In accordance with still another preferred embodiment of the present invention, the circuitry for detecting the chemistry of the at least one battery may preferably be adapted to prevent supply of charging current to the at least one battery when the battery chemistry detection circuitry determines that the at least one battery is a primary battery. In all of the above charger embodiments, the at least one battery mounted within the charger is preferably replaceably mounted. Additionally, the charger may further comprise conversion circuitry for converting the voltage of the external power source to that suitable for inputting to the electronic device.

In connection with the above described chargers, the external power source may preferably be either an AC mains power source, or the low voltage DC output of a conventional wall charger, or the output of a car lighter socket.

There is further provided in accordance with still another preferred embodiment of the present invention, a charger for a battery operated electronic device, comprising:
(i) an input for connection to an external power source,
(ii) an output for connection to the battery operated electronic device,
(iii) a cavity for mounting at least one battery within the charger which can supply the electronic device with current when the charger is not connected to the external power source: and
(iv) control circuitry powered by the at least one battery, for disconnecting the charger from the external source when the at least one battery is fully charged and when the electronic device is not drawing current from the charger.

In such a charger, the at least one battery may be either a primary or a secondary battery. Furthermore, the control circuit may preferably be adapted to monitor the current drawn by the portable electronic device, and to reconnect the charger to the external source when such current demand exceeds a predetermined level, or to monitor the state of charge of the at least one battery, and to reconnect the charger to the external source when the state of charge falls below a predetermined level. In the latter case, the state of charge is monitored by monitoring at least one of the terminal voltage of the at least one battery, and the elapsed time since the at least one battery was charged. Finally, in such chargers, the external source may preferably be the mains supply, and disconnection of the charger from the external source essentially eliminates the stand-by current drawn from the mains supply.

In any of the above described charger embodiments, the charger may preferably be in a physically separate housing from the electronic device.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
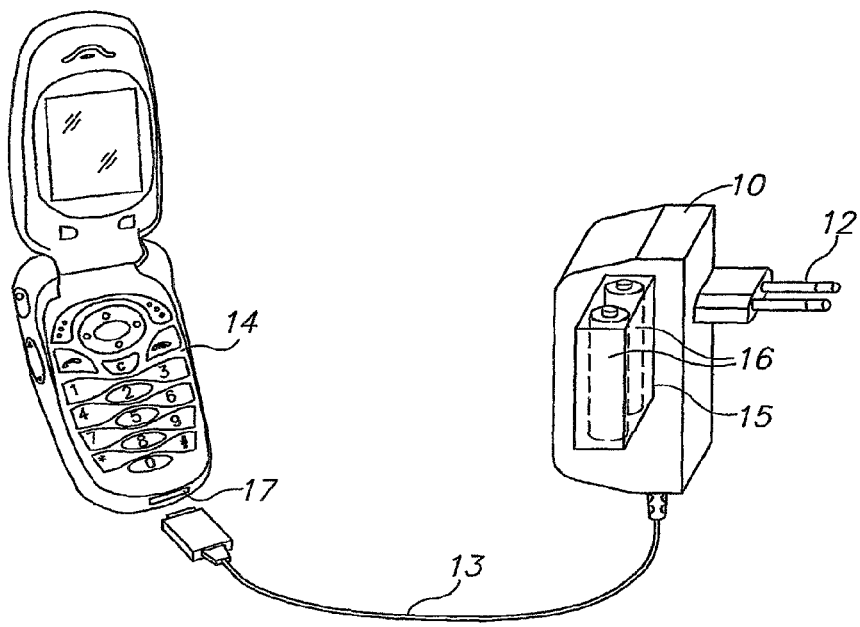
FIG. 1 illustrates schematically a wall charger, constructed and operative according to a first preferred embodiment of the present invention, and its connection to a portable electronic device.

Reference is now made to FIG. 1, which illustrates schematically a wall charger 10, constructed and operative according to a first preferred embodiment of the present invention, The wall charger preferably has conventional power pins 12 for inserting into a wall socket (not shown), though it may also use a conventional plug on the end of a flying lead cable, or a push-in plug for use with a cigarette lighter socket in a car. A cable 13 provides connection to a mobile telephone 14, used as an example of a portable electronic device which can be charged by the wall charger. The output may equally well be provided in the form of a cradle in which the phone or other electronic device sits without a connection cable. The wall charger 10 differs, however, from a conventional wall charger in that it also contains a battery cavity 15, inside of which can be installed one or more cells or batteries 16, which are preferably secondary. Alternatively and preferably, primary cells or batteries may be used, this being understood to include a fuel cell also. The wall charger can be used in the conventional manner, whereby the cable 13 is plugged into the charging socket 17 of the phone 14, and the phone operated or the internal battery of the phone charged from the fixed power supply. At the same time that the wall charger is operating the phone or charging the phone's internal battery, it can also charge the wall charger internal battery 16, if it is a secondary battery, so as to maintain it in a state of full charge. If it is desired to operate the phone or charge the phone battery in a situation where no fixed power source is available into which to plug the wall charger, then the wall charger is connected to the phone by means of its cable 13, or by means of mounting into the charging cradle, and the phone is supplied with current from the wall charger's internal battery 16. The internal circuitry of the wall charger is preferably designed to prevent charging of its internal battery 16 if it is a primary battery.

Figure 2:
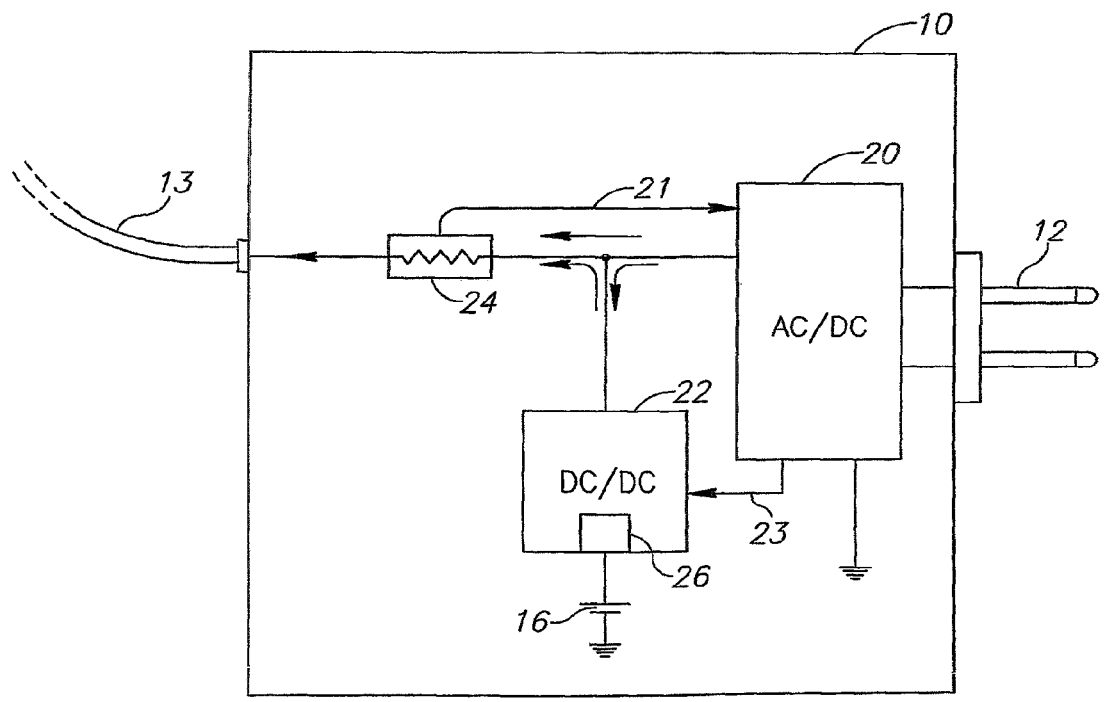
FIG. 2 is a schematic block diagram showing one preferred embodiment of the internal circuitry of the wall charger of the present invention.

Reference is now made to FIG. 2, which is a schematic block diagram showing one preferred embodiment of the internal circuitry of the wall charger 10 of the present invention shown in FIG. 1. The comparatively high AC mains voltage, input through the power pins 12 from the fixed power source, is first preferably converted down to a comparatively low DC voltage in the AC/DC converter circuit 20. This DC voltage is preferably chosen to be suitable for direct application to the power input socket of the mobile device. In the case of a "wall charger" for plugging into an automobile cigarette lighter socket, the circuit 20 would be a DC-DC converter, which converts the 12 V DC input from the cigarette lighter socket to a preferably lower DC voltage output for use directly at the input to the mobile device. In the case that the external source of power is a conventional wall charger which provides a low voltage DC output, the AC/DC converter circuitry 20 may be omitted since the external power source contains these functions. This last embodiment is described further in the embodiments of FIGS. 3 and 4. The converter circuit 20 is preferably configured as a current source, as is the usual case in battery charging adapters, simply driving charge current into the power input socket of the phone or other device connected to the charging cable 13. A current sensing resistor 24 preferably provides a feedback sense signal 21 to the AC/DC converter circuit 20, to limit the charge current it can supply to the phone or other device.

The DC output of the converter circuit 20 is also preferably connected to a bidirectional DC/DC converter and charge control circuit 22, which is directly connected to the internal battery 16 of the wall charger. The bidirectional converter and charging circuit 22 controls the flow of charging current from the DC output of the AC/DC converter circuit 20, or from the DC power source when applicable, into the internal battery 16 when the charger is plugged into the external power source, and converts the voltage to that suitable for charging the internal battery 16. The DC/DC converter preferably includes a battery chemistry detection circuit 26, such that charging current can be disabled if the circuit detects that the internal battery 16 is not a secondary battery, or is a secondary battery but is in a condition that indicates that charging would not be advised.

The DC/DC converter also controls the flow of charging current from the internal battery 16 to the phone or other device through the charging cable 13, when the charger is not plugged into the external power source, and performs the voltage conversion to enable the internal battery to power the mobile device. The bidirectional charge control circuit 22 is thus functional to fully control the flow of current into and out of the internal battery 16 of the charger, and to convert the voltages to levels suitable for charging the battery 16 or for powering the mobile device 14. An optional STATUS signal line 23 may preferably be provided to notify the charge control and conversion circuit 22 when the wall charger is plugged into an external power source, so that it can enable charging of the internal battery 16, but may disable discharging thereof. This feature may be useful since the external power source, when plugged in, can generally supply all of the current required by the phone or other mobile device, and there may be no need to draw current from the internal battery. With or without the STATUS signal input, the battery powered charger of the present invention also differs from those generally described in the prior art, in that the circuit arrangement of the present invention, when plugged into the external power source, is able to both recharge its own internal battery 16, and to supply the phone or other mobile device 14 with current for operating or for charging its own internal battery.

In embodiments of the charger which are intended only for use with a primary battery, the bidirectional charging circuit 22 can be replaced by a unidirectional circuit which needs to control only the flow of charging current from the internal battery 16 out to the charging cable 13.

Although for clarity, each of the circuit functions have been schematically shown in FIG. 2 as separate blocks, it is to be understood that in practice, all or some of the functions may preferably be performed by one multi-functional circuit.

Figure 3:
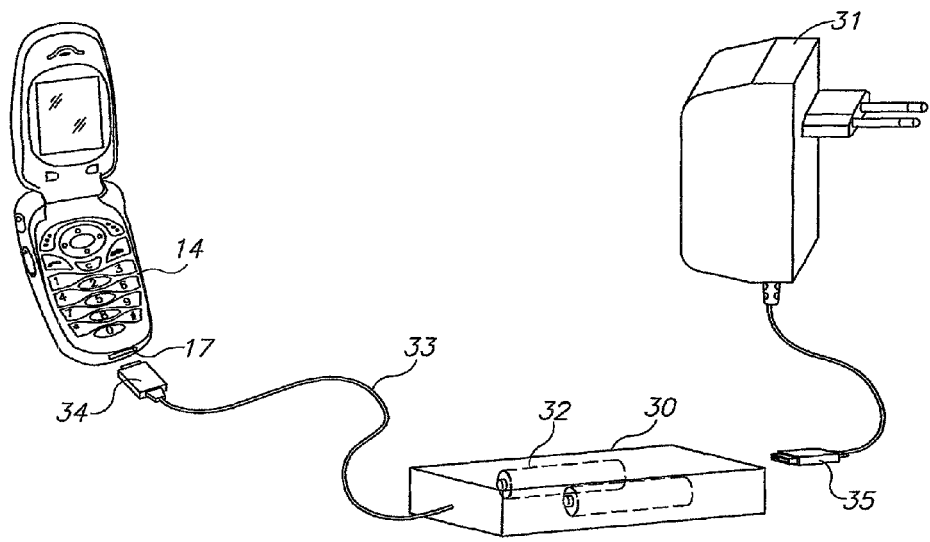
FIG. 3 illustrates schematically a wall charger, constructed and operative according to a second preferred embodiment of the present invention, differing from that of FIG. 1 in that the auxiliary battery is mounted in a housing separate from the external charger.

Reference is now made to FIG. 3, which is a schematic illustration of a further preferred embodiment of the battery powered charger 30 of the present invention. The charger contains an auxiliary battery or cell or cells 32, replaceable if needed, and charge control circuitry (not shown in FIG. 3) for controlling flow of current out of this battery or cell to the mobile telephone 14 (used as a non-limiting example of the portable electronic device), and into this battery or cell when charged by the external source. This embodiment is thus similar in concept to that shown in FIGS. 1 and 2, with the difference that in this embodiment, use is made of a conventional wall charger 31, such as that generally supplied with the phone 14, as the external power source. This conventional wall charger supplies a low DC voltage both for powering the mobile phone 14 or charging its internal battery, and for charging the auxiliary battery or cells 32 of the battery powered charger 30 of this embodiment. In the preferred example shown in FIG. 3, the battery powered charger 30 contains two cells, but it could equally well contain a single cell or battery, or more than two cells. The advantage of this embodiment is that the battery powered charger 30 is then an independent unit, which can be provided as an optional accessory in addition to the normal wall charger 31 of the device. The battery powered charger 30 is preferably connected to the charging port 17 of the portable electronic device by means of a cable 33. In order to provide interchangeability with the conventional charger 31, the plug 34 provided on the end of this cable is preferably of the same type as the plug 35 provided on the conventional wall charger of the electronic device. The conventional wall charger can thus be used to power the phone or charge the phone's internal battery in one of two different modes; either with the conventional wall charger plugged directly into the phone, or with the conventional wall charger feeding the battery powered charger 30 of this embodiment, which then operates in a feed through charging configuration.

Figure 4:
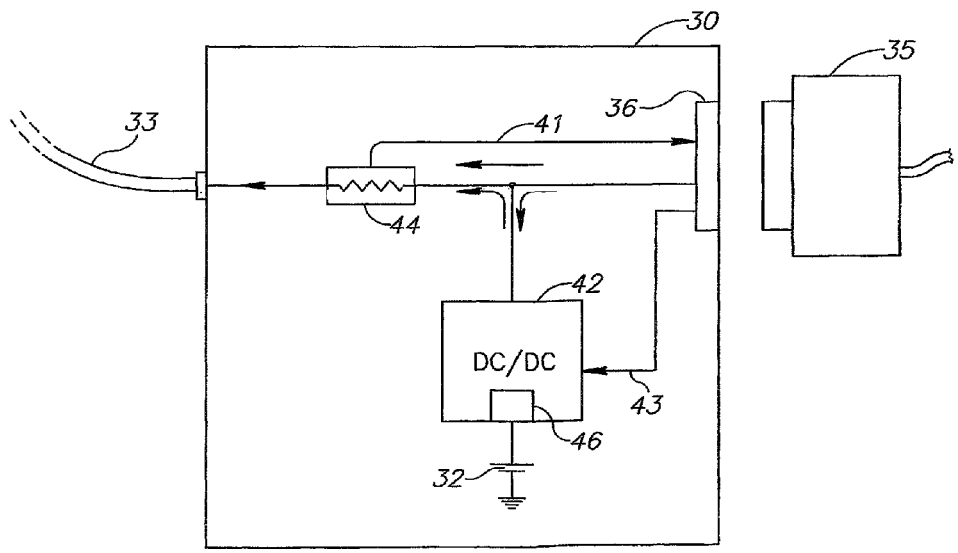
FIG. 4 is a schematic block diagram showing a preferred embodiment of the internal circuitry of the battery powered charger of the embodiment of FIG. 3.

Reference is now made to FIG. 4, which is a schematic block diagram showing one preferred embodiment of the internal circuitry of the battery powered charger 30 of the embodiment of FIG. 3 of the present invention. The circuit structure is essentially similar to that of FIG. 2 except that the AC/DC converter circuitry 20 of the embodiment of FIG. 2 now preferably resides within the conventional wall charger 31 of FIG. 3. The DC output current from the conventional wall charger 31 is preferably input from its cable plug 35 through an input socket 36. The conventional wall charger is preferably configured as a current source, as is the usual case in battery charging adapters, simply driving charge current from the input socket 36, straight through the battery powered charger 30, and into the charging input socket 17 of the phone. A current sensing resistor 44 may preferably be provided to supply a feedback sense signal 41 back to the conventional wall charger 31, to limit the charge current it can supply to the phone.

The DC output of the conventional wall charger external power source is also connected to a bidirectional DC/DC converter and charge control circuit 42, which is directly connected to the internal battery 32 of the battery powered charger. The DC/DC converter preferably includes a battery chemistry detection circuit 46, such that charging current can be disabled if the circuit detects that the internal battery 32 is not a secondary battery, or is a secondary battery but is in a condition that indicates that charging would not be advised. The bidirectional converter and charging circuit 42 controls the flow of charging current from the input DC power source into the internal battery 32 when the battery powered charger is connected to the conventional wall charger external power source, and converts the voltage to that suitable for charging the internal battery 32. It also controls the flow of charging current from the internal battery 32 to the phone or other device through the charging cable 33, when the battery powered charger is not connected to the conventional wall charger external power source, and performs the voltage conversion to enable the internal battery to power the mobile device. The bidirectional charge controller 42 is thus functional to fully control the flow of current into and out of the internal battery 32 of the battery powered charger, and to convert the voltages to levels suitable for charging the battery 32 or for powering the mobile device 14. An optional STATUS signal line 43 may preferably be provided to notify the charge control circuit 42 when the wall charger is plugged into an external power source, so that it can enable charging of the internal battery 16, but disables discharging thereof.

In embodiments of the charger which are intended only for use with a primary battery, the bidirectional converter and charging circuit 42 can be replaced by a unidirectional circuit which needs to control only the flow of charging current from the internal battery 32 out to the charging cable 33.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A charger for a battery operated electronic device, said charger comprising:
    an input for connection to an external power source supplying current at a first voltage;
    an output for connection to said battery operated electronic device;
    circuitry for supplying said electronic device with current when said charger is connected to said external source;
    a cavity for mounting in said charger at least one battery having a terminal voltage different from said first voltage, and different from the voltage required for inputting to said electronic device, said battery supplying said electronic device with current when said charger is not connected to said external power source;
    a bidirectional converter and charge controller for controlling current supplied from said at least one battery mounted in said charger to said electronic device, and for controlling current flowing into said at least one battery when said charger is connected to said external power source; and
    circuitry for detecting the chemistry of said at least one battery.

2. A charger according to claim 1 and wherein said bidirectional converter and charge controller is further adapted to convert said first voltage to a voltage suitable for charging said at least one battery, and to convert said terminal voltage to a voltage suitable for inputting to said electronic device.

3. A charger according to claim 1, wherein said external power source can simultaneously cause current to charge said at least one battery, and to supply said electronic device.

4. A charger according to claim 1, and wherein said current supplied by said charger to said electronic device is utilized to perform at least one of operating said electronic device and charging the battery of said electronic device.

5. A charger according to claim 1, and wherein said converter and charge control circuit further comprises circuitry to prevent supply of charging current to said at least one battery when said charger is connected to said external power source.

6. A charger according to claim 1, and wherein said circuitry for detecting the chemistry of said at least one battery is adapted to prevent supply of current for charging said at least one battery when said battery chemistry detection circuitry determines that said at least one battery is a primary battery.

7. A charger according to claim 1, and wherein said at least one battery mounted within said charger is replaceably mounted.

8. A charger according to claim 1, further comprising conversion circuitry for converting the voltage of said external power source to that suitable for inputting to said electronic device.

9. A charger according to claim 1, and wherein said external power source is an AC mains power source.

10. A charger according to claim 1, and wherein said external power Source is the low voltage DC output of a conventional wall charger.

11. A charger according to claim 1, and wherein said external power source is the output of a car lighter socket.

12. A charger according to claim 1, and wherein said charger is in a physically separate housing from said electronic device.

* * * * *